June 11, 1968  D. M. BROWN  3,387,788
EXHAUST NOZZLES
Filed Feb. 17, 1966  2 Sheets-Sheet 1
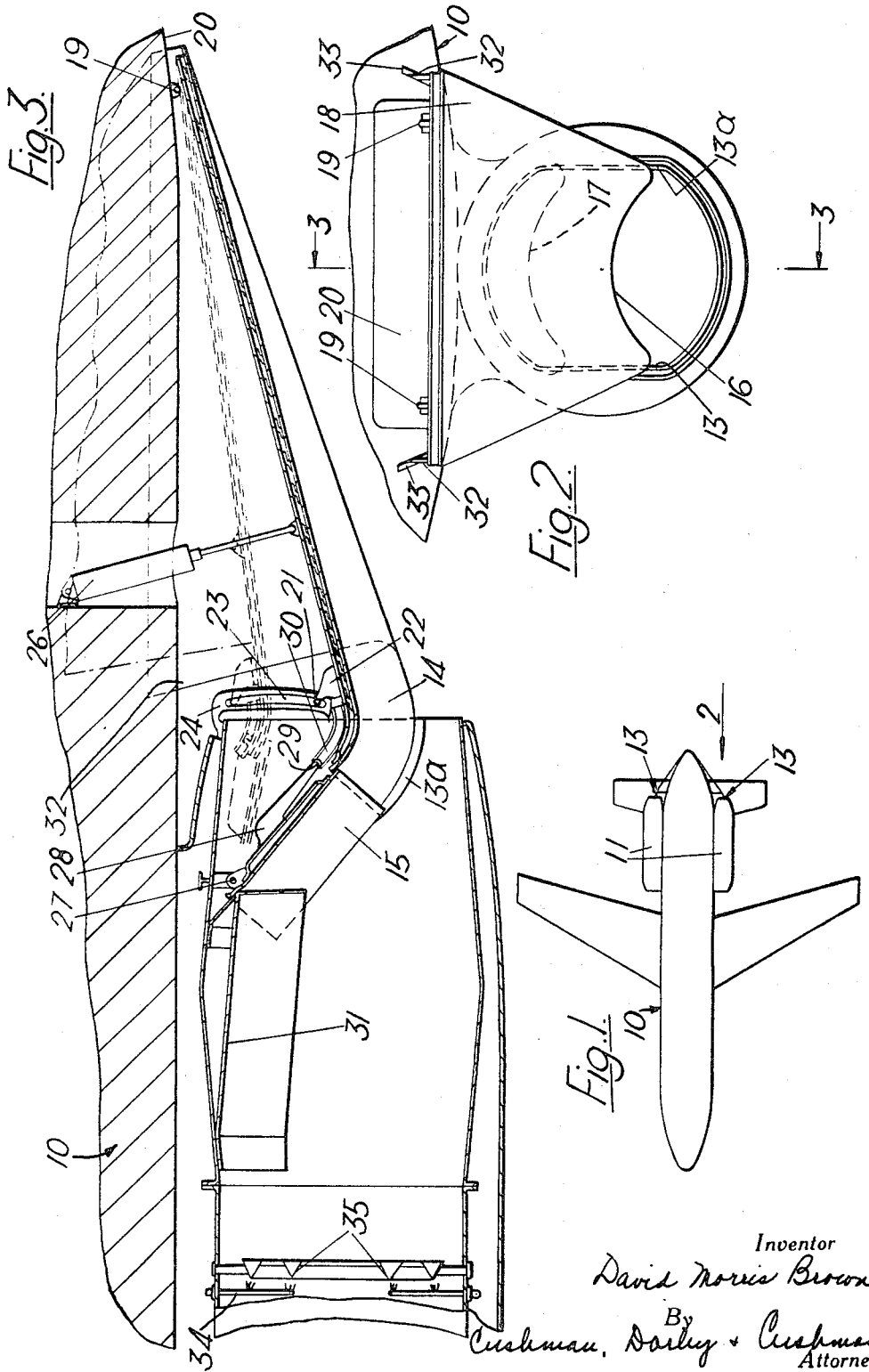
Inventor
David Morris Brown
By
Cushman, Darby & Cushman
Attorneys June 11, 1968    D. M. BROWN    3,387,788

EXHAUST NOZZLES

Filed Feb. 17, 1966    2 Sheets-Sheet 2

INVENTOR
DAVID MORRIS BROWN

BY Cushman Darby & Cushman
ATTORNEYS

United States Patent Office 3,387,788
Patented June 11, 1968

3,387,788
EXHAUST NOZZLES
David Morris Brown, Allestree, Derby, England, assignor to Rolls-Royce Limited, Derby, England, a British company
Filed Feb. 17, 1966, Ser. No. 528,136
Claims priority, application Great Britain, Mar. 15, 1965, 10,964/65
4 Claims. (Cl. 239—265.37)

ABSTRACT OF THE DISCLOSURE

A gas turbine jet propulsion engine exhaust nozzle, the exhaust gas expansion control surface comprising at least one flap having a portion extending externally of the nozzle outlet area into one side thereof, the protruding flap having its surface facing away from the axis of the nozzle unexposed to ambient air, the flap being movable in conjunction with another axially overlapping flap positioned internally of the nozzle so as to vary the nozzle outlet area and define a variable throat thereat.

---

This invention concerns propulsion nozzles.

According to the present invention there is provided a gas turbine jet propulsion engine variable area propulsion nozzle having a throat, part of which comprises two overlapping flap members mounted so as to be movable in such a manner as to retain the throat of the nozzle within the nozzle outlet when said flap members are moved substantially radially towards or away from the engine axis to vary the throat area of the nozzle, and means by which said movement of said flaps is attained.

The invention will now be described with reference to the accompanying drawings in which—

FIGURE 1 is an inverted plan view of an aircraft having engines provided with propulsion nozzles in accordance with the invention.

FIGURE 2 is a view in the direction of arrow 2 in FIGURE 1,

FIGURE 3 is a cross-sectional view on the line 3—3 in FIGURE 2;

Figure 4:
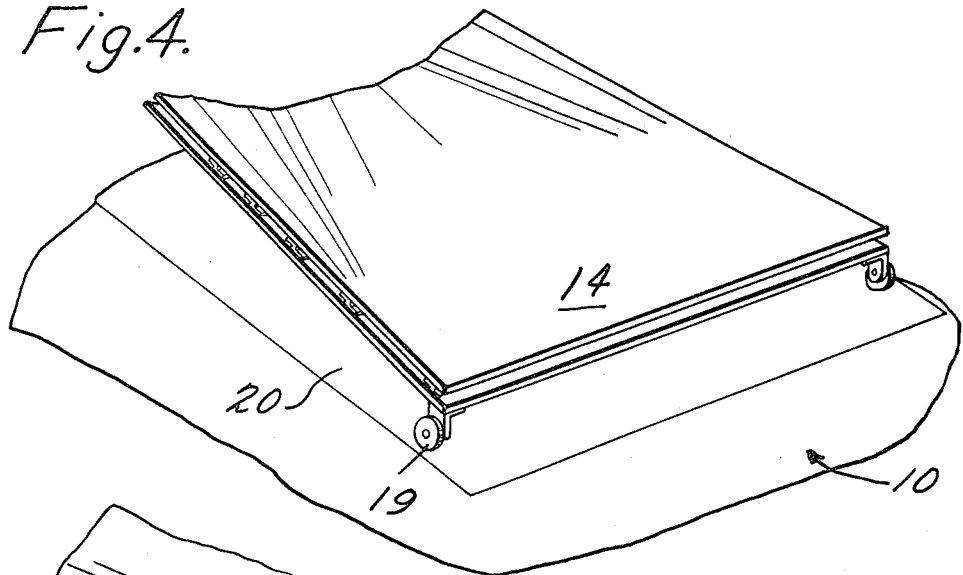
FIGURE 4 is a fragmentary perspective view of the trailing end of the flap, the view illustrating the rollers of the flap in contact with the flat surface on the aircraft structure.
Figure 5:
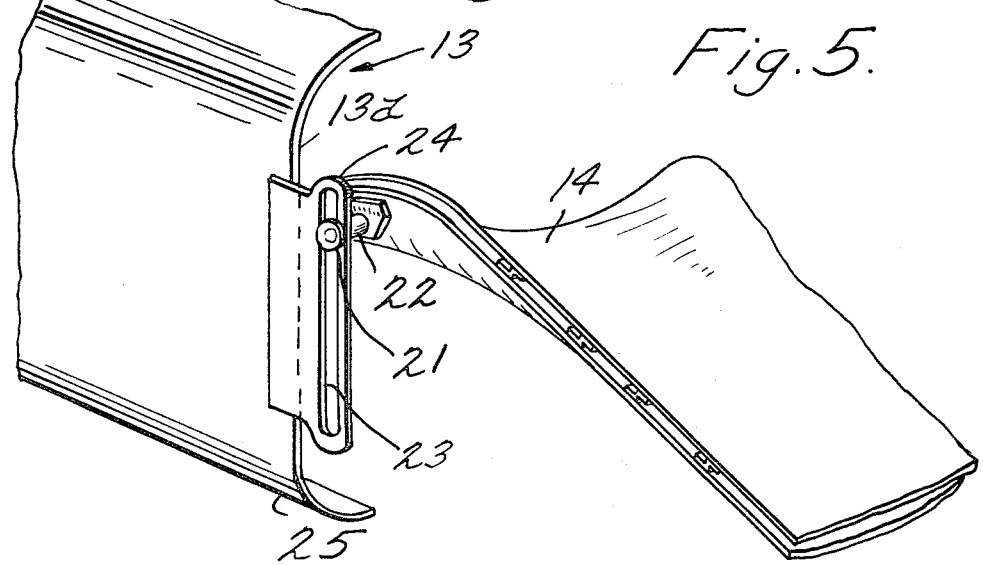
FIGURE 5 is a fragmentary perspective view illustrating the inter-engagement of the rollers on the upstream end of the flap with a track provided in brackets mounted on the fixed structure.
Figure 6:
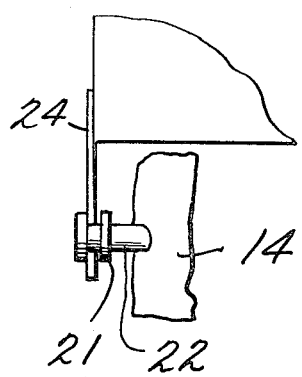
FIGURE 6 is a further fragmentary view of the rollers on the upstream end of the flap cooperating with the track.

In FIGURE 1 an aircraft 10 is powered by gas turbine jet propulsion engines 11, from which propulsive gases are expelled via propulsion nozzles 13. The outlet area of nozzles 13 may be varied by means of movable flap members 14-15.

Flap member 14 is curved transversely to the engine axis at its upstream end 16, so as to nest within nozzle 13 when in the retracted position as shown by the dotted line 17 in FIGURE 2. The surface of flap member 14 changes from said curve at its upstream end 16 to a flat surface at its downstream end 18 in order to permit expansion of the propulsive gases from engine 11.

Rollers 19 are mounted on the underside of flap member 14, adjacent downstream end 18. Said rollers 19 are in rolling contact with a substantially flat surface 20 on the fuselage of aircraft 10. Further rollers 21 are mounted on brackets 22 on the underside of flap member 14 near its upstream end, and are in rolling engagement with a track 23 in further brackets 24 mounted on fixed structure 25.

A pair of rams 26, of which only one is shown, are pivotally attached at one end to fixed structure within the fuselage of aircraft 10, and at the other end to the underside of flap member 14. Extension or retraction of rams 26 will cause flap member 14 to move towards or away from the axis of engine 11. As the downstream end of flap member 14 is axially movable on rollers 19 and the upstream end of flap member 14 is attached to bracket 24 via track 23 and rollers 21, the actual path through which the upstream end of flap member 14 will move, will be controlled by the shape of said track 23, said shape being such that a point P on the outer surface of flap member 14, will move in a substantially radial line and will at all times remain at or within the downstream extremity of propulsion nozzle 13, thus ensuring that the throat of propulsion nozzle 13 remains in an acceptable position regardless of the position of flap member 14 relative to the engine axis.

Two side portions 13a of nozzle 13 are peened inwards so as to be parallel with each other, thereby providing a seal between themselves and the sides of flap member 14 as said flap member moves towards or away from the axis of engine 11.

Flap member 15 is curved transversely to the engine axis and has its upstream end pivotally attached to fixed structure 27, and its downstream end in sliding, overlapping engagement with the upstream end of flap member 14. A bracket 28 mounted on the underside of flap member 15, carries a roller 29 on its downstream end, said roller 29 is in rolling engagement with a track 30 mounted on the underside of the upstream end of flap member 14, so that when rams 26 are actuated to move flap member 14 towards or away from the axis of engine 11, the downstream end of flap member 15 will follow the upstream end of flap member 14, pivoting about fixed structure 27 as it does so.

A ramp 31 is provided upstream of nozzle 13 so as to avoid a too rapid change of direction of the flow of gas to said propulsion nozzle 13.

Fairings 32 are provided on both sides of flap member 14, and are arranged so as to move in and out of slots 33 in the fuselage of aircraft 10, as flap members 14-15 are moved towards and away from the axis of engine 11.

When reheat is required, fuel is ejected from supply pipes 34 and burnt on gutters 35. Rams 26 are actuated, causing flap members 14-15 to move away from the axis of engine 11 to the position shown in dotted lines, so as to increase the outlet area of nozzle 13, thereby permitting the increased volume of propulsive gases resulting from the use of reheat, to pass unobstructed through nozzle 13.

The invention is not restricted to engines equipped with reheat. For example, if it is required to increase the thrust produced by an engine which has no reheat equipment, in such circumstances as take-off, flap members 14-15 can be moved towards the engine axis, thus reducing the outlet area of nozzle 13, and increasing the thrust of the engine 11.

I claim:

1. In combination with fixed aircraft structure, an external expansion propulsion nozzle for a gas turbine jet propulsion engine, said external propulsion nozzle having a variable throat at the nozzle outlet, said variable throat being defined by fixed hollow structure of said nozzle which has one side of the exterior of the same closely positioned adjacent the fixed aircraft structure and two movable overlapping flap members, a first one of said flap members being positioned internally of said fixed hollow structure and the other of said flap members having its upstream end overlapping the first flap member within the nozzle outlet and protruding downstream in the direction of gas flow exteriorly from the nozzle outlet with its surface facing away from the axis of the nozzle adjacent the fixed aircraft structure and unexposed to ambient air, means for moving said flap members relative to said fixed hollow structure to vary the throat at the nozzle outlet, and guiding means for guiding the upstream end of said protruding flap member in a substantially radial path adjacent to the nozzle outlet whereby the locus of said throat is defined when said flap members are moved by said moving means.

2. The combination as claimed in claim 1 in which said guiding means includes slotted members attached to said fixed hollow structure and in which the upstream end of said protruding flap member is provided with rollers mounted for guiding movements within the slots of said slotted member, said guiding means further comprising rollers mounted on the downstream end of said protruding flap, said fixed aircraft structure being provided with a substantially flat surface, said rollers on the downstream end of said protruding flap having rolling contact with said substantially flat surface.

3. The combination as claimed in claim 1 in which said flap member moving means includes rams coupled to at least one of said flap members.

4. The combination as claimed in claim 1 in which said fixed aircraft structure is an aircraft fuselage.

References Cited

UNITED STATES PATENTS

| | | | |
|---|---|---|---|
| 2,780,056 | 2/1957 | Colley | 239—265.41 |
| 2,926,491 | 3/1960 | Hyde | 239—265.41 |
| 2,972,226 | 2/1961 | Geary | 239—265.39 |
| 2,976,676 | 3/1961 | Kress | 239—265.39 |
| 2,999,354 | 9/1961 | Gallo et al. | 239—265.41 |
| 3,046,730 | 7/1962 | Petren | 239—265.39 |
| 3,048,973 | 8/1962 | Benedict | 239—265.39 |
| 3,157,027 | 11/1964 | May | 239—265.41 |

EVERETT W. KIRBY, *Primary Examiner.*